United States Patent
Dai et al.

(10) Patent No.: US 11,683,121 B2
(45) Date of Patent: Jun. 20, 2023

(54) SYSTEMS AND METHODS FOR UPLINK SIGNALING

(71) Applicant: ZTE CORPORATION, Guangdong (CN)

(72) Inventors: Jianqiang Dai, Guangdong (CN); Zhifeng Yuan, Guangdong (CN); Weimin Li, Guangdong (CN); Yuzhou Hu, Guangdong (CN); Hong Tang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/199,893

(22) Filed: Mar. 12, 2021

(65) Prior Publication Data

US 2021/0203457 A1 Jul. 1, 2021

Related U.S. Application Data

(63) Continuation of application No. PCT/CN2018/105446, filed on Sep. 13, 2018.

(51) Int. Cl.
*H04L 1/00* (2006.01)
*H04L 5/00* (2006.01)
(Continued)

(52) U.S. Cl.
CPC ............ *H04L 1/0041* (2013.01); *H04L 5/005* (2013.01); *H04L 5/0044* (2013.01);
(Continued)

(58) Field of Classification Search
None
See application file for complete search history.

(56) References Cited

U.S. PATENT DOCUMENTS

| 2002/0114297 A1* | 8/2002 | Karna | H04W 74/008 370/335 |
| 2005/0063327 A1* | 3/2005 | Krauss | H04L 5/0048 370/335 |

(Continued)

FOREIGN PATENT DOCUMENTS

| CN | 101578783 A | 11/2009 |
| CN | 101990237 A | 3/2011 |

(Continued)

*Primary Examiner* — Clemence S Han
(74) *Attorney, Agent, or Firm* — Duane Morris LLP

(57) ABSTRACT

This disclosure relates generally to wireless communications and, more particularly, to systems and methods for uplink signaling using blind channel estimation at a base station. In one embodiment, a method performed by a communication device, includes: associating a time slot with a data packet comprising a head portion and a tail portion, wherein the head portion comprises a communication device identifier and the tail portion comprises user data associated with the head portion; spreading the head portion into a first predetermined transmission format; spreading the tail portion into a second predetermined transmission format; and transmitting the spreaded head portion with the spreaded tail portion to a communication node, wherein the spreaded head portion comprises information to be used by the communication node for channel estimation and for decoding the tail portion to retrieve the user data.

17 Claims, 7 Drawing Sheets

(51) Int. Cl.
*H04L 25/02* (2006.01)
*H04L 27/26* (2006.01)
*H04W 72/21* (2023.01)
*H04W 72/0446* (2023.01)

(52) U.S. Cl.
CPC ...... *H04L 25/0238* (2013.01); *H04L 27/2602* (2013.01); *H04W 72/21* (2023.01); *H04L 27/2636* (2013.01); *H04W 72/0446* (2013.01)

(56) References Cited

U.S. PATENT DOCUMENTS

| | | | | |
|---|---|---|---|---|
| 2010/0329380 | A1* | 12/2010 | Kang | H04J 13/18 375/296 |
| 2011/0007844 | A1* | 1/2011 | Park | H04B 1/7097 375/302 |
| 2011/0064161 | A1* | 3/2011 | Lim | H04L 25/4904 375/295 |
| 2019/0357272 | A1* | 11/2019 | Lim | H04W 74/0841 |

FOREIGN PATENT DOCUMENTS

| | | |
|---|---|---|
| CN | 102724156 A | 10/2012 |
| CN | 103077724 A | 5/2013 |

* cited by examiner

SYSTEMS AND METHODS FOR UPLINK SIGNALING

TECHNICAL FIELD

This disclosure relates generally to wireless communications and, more particularly, to systems and methods for uplink signaling using blind channel estimation at a base station.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

For many wireless communication systems, the transmission of physical control channels or physical data channels is aided by utilization of a pilot signal. This pilot signal may come with a data payload (e.g., user data) and be utilized for channel estimation. For example, a demodulation reference signal (DMRS) is a pilot signal which can be used for channel estimation or multi-user detection (e.g., identification of a specific user equipment (UE) among a plurality of UEs communicating with a base station (BS)). Typically, a pilot signal is a signal with a predetermined value known to both the sender and receiver of the pilot signal.

In traditional long term evolution (LTE) systems, DMRS resources are configured in a physical channel for both uplink transmissions and downlink transmissions. For example, an uplink subframe may contain two DMRS time domain symbols and 12 data payload time domain symbols. Via channel estimation, the channel response values from the 12 data payload time domain symbols may be determined by, for example, interpolation of the channel response values determined from DMRS symbols. The data payload may then be retrieved based on the channel response values for the 12 data payload time domain symbols.

However, issues may arise when there are a large number of UEs in a network. For example, the number of predetermined pilot signals may be finite. Accordingly, when the number of UEs in a network outnumbers the supply of predetermined pilot signals, the system will inevitably allocate a same pilot signal to multiple UEs. This produces duplicative pilot signals from different UEs, or pilot collisions. The effect of such pilot collisions may be deleterious to system performance.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication device, includes: associating a time slot with a data packet comprising a head portion and a tail portion, wherein the head portion comprises a communication device identifier and the tail portion comprises user data associated with the head portion; spreading the head portion into a first predetermined transmission format; spreading the tail portion into a second predetermined transmission format; and transmitting the spreaded head portion with the spreaded tail portion to a communication node, wherein the spreaded head portion comprises information to be used by the communication node for channel estimation and for decoding the tail portion to retrieve the user data.

In a further embodiment, a method performed by a communication node includes: receiving a data packet over a time slot from a communication device; identifying a head portion and a tail portion from the data packet, wherein the head portion comprises a communication device identifier and the tail portion comprises user data associated with the head portion; blind decoding the head portion from a first predetermined transmission format; performing channel estimation based on the decoded head portion; and decoding the tail portion based on the decoded head portion and a result of the channel estimation to retrieve the user data.

In a further embodiment, a communication device includes: at least one processor configured to: associate a time slot with a data packet comprising a head portion and a tail portion, wherein the head portion comprises a communication device identifier and the tail portion comprises user data associated with the head portion, spread the head portion into a first predetermined transmission format, spread the tail portion into a second predetermined transmission format; and at least one transmitter configured to: transmit the spreaded head portion with the spreaded tail portion to a communication node, wherein the spreaded head portion comprises information to be used by the communication node for channel estimation and for decoding the tail portion to retrieve the user data.

In a further embodiment, a communication node includes: a receiver configured to: receive a data packet over a time slot from a communication device; and at least one processor configured to: identify a head portion and a tail portion from the data packet, wherein the head portion comprises a communication device identifier and the tail portion comprises user data associated with the head portion, blind decode the head portion from a first predetermined transmission format, perform channel estimation based on the decoded head portion, and decode the tail portion based on the decoded head portion and a result of the channel estimation to retrieve the user data.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
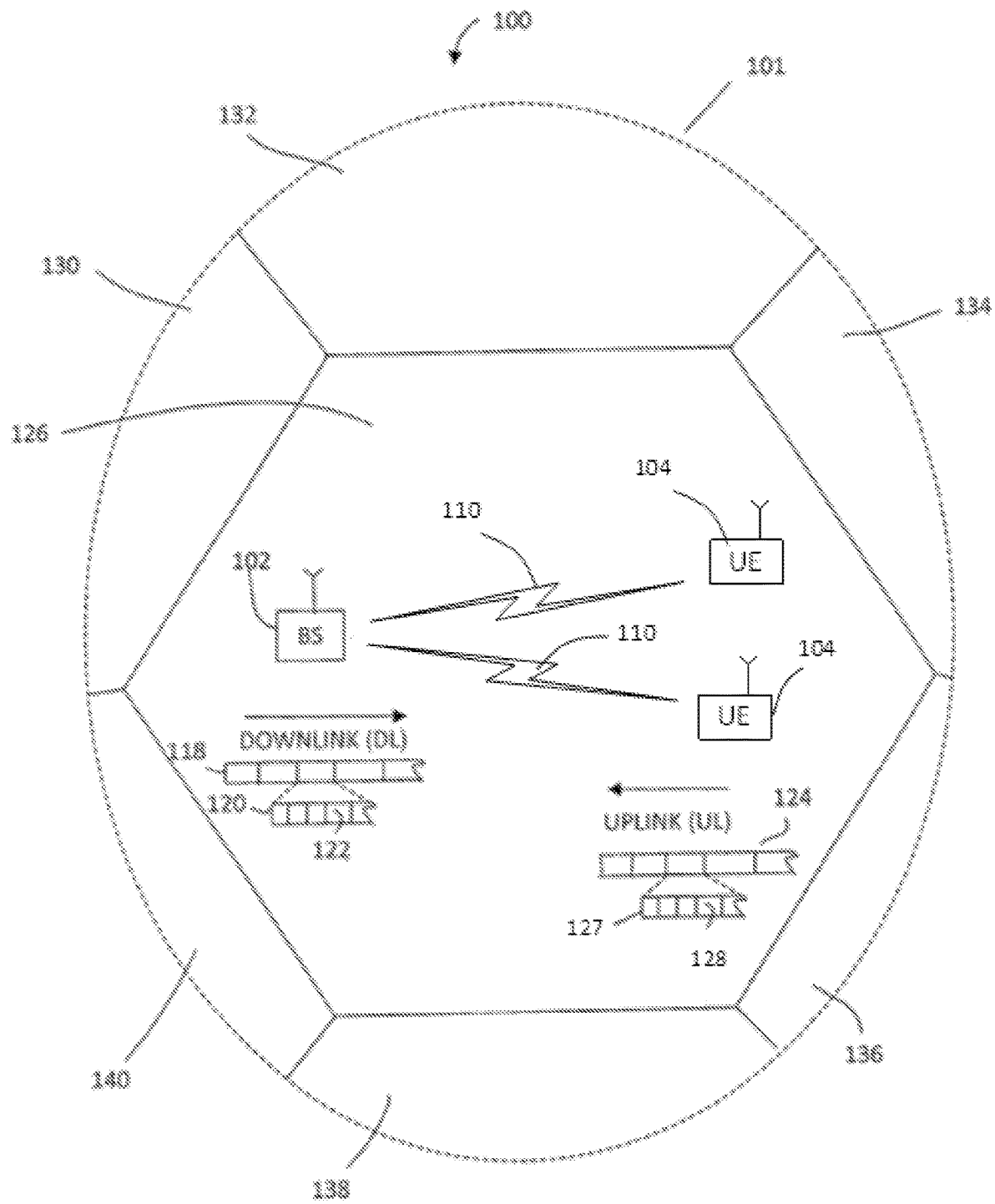
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and multiple user equipment devices 104 (hereinafter "UEs 104") that can communicate with each other via respective communication links 110 (e.g., a wireless communication channel) between the BS 102 and respective UEs 104, and a cluster of notional cells 126, 130, 132, 134, 136, 138 and 140 overlaying a geographical area with a network 101. Each UE 104 may undergo a random access procedure to join the network 101. In FIG. 1, the BS 102 and each UE 104 are contained within a respective geographic boundary of cell 126. Each of the other cells 130, 132, 134, 136, 138 and 140 may include at least one BS operating at its allocated bandwidth to provide adequate radio coverage to its intended users. Accordingly, reference to a cell may be a short hand reference to a BS with an associated coverage region or area. In certain embodiments, a cell may be interchangeably referred to as a BS.

For example, the BS 102 may operate at an allocated channel transmission bandwidth (e.g., spectrum) to provide adequate coverage to each UE 104. The spectrum may be regulated to define a licensed range and/or an unlicensed range. The BS 102 and each UE 104 may communicate via a downlink radio frame 118, and an uplink radio frame 124 respectively. The radio frames may also be referred to more simply as a frame. Each frame 118/124 may be further divided into sub-frames 120/127 which may include data symbols 122/128. In the present disclosure, the BS 102 and each UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE in relationship to a BS and a communication node may refer more specifically to a BS in relation to the UE.

Figure 2:
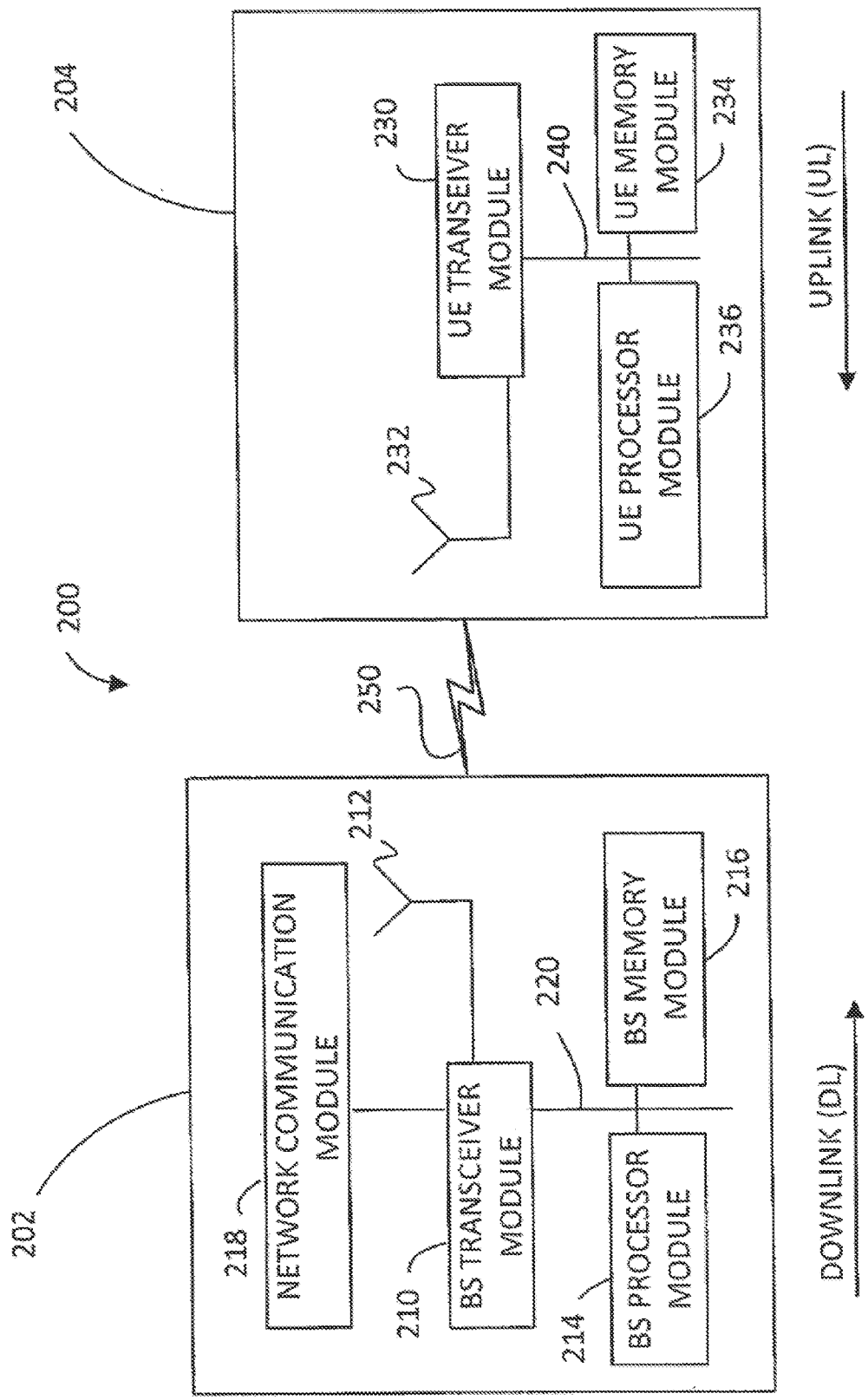
FIG. 2 illustrates block diagrams of an exemplary base station (BS) and a user equipment (UE) device, in accordance with some embodiments of the present disclosure.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment or network 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

As noted above, certain communication systems may utilize a pilot signal (e.g., a demodulation reference signal (DMRS) for channel estimation and retrieval of a data payload (e.g., user data). However, as noted above, when the number of UEs in a network outstrips the finite supply of predetermined pilot signals, the communication system utilizing pilot signals will inevitably allocate a same pilot to multiple UEs and incur a pilot collision.

Accordingly, systems and methods in accordance with various embodiments are directed to blind channel estimation for uplink signals. This blind channel estimation may not rely upon a pilot signal, or any predetermined signal. Rather, this blind channel estimation for uplink signals may rely upon a data frame structure (e.g., a packet structure) that includes a head portion and a tail portion. The head portion may include head information useful for the decoding of the data frame and for channel estimation. For example, head information may include a UE identifier (e.g., UE_ID), a spreading sequence identifier (e.g., Sequence_ID), power information (e.g., a signal power, or a power ratio between different UEs, or a power ratio between different layers of a UE), multi-layer information (e.g., information characterizing the layers), and/or other information that may be utilized for decoding of the data frame and/or for channel estimation. The tail portion may include a data payload or user data for transmission from the UE to the BS. This type of blind channel estimation for uplink signals improves upon systems that rely upon finite pilot signals for channel estimation as there is no finite number of pilot signals to outstrip. In certain embodiments, this blind channel estimation is executed via a symbol constellation shape in a complex plane, which is utilized together with certain types of interference cancellation or suppression methods, such as an ergodic method, or maximum likelihood estimation, or Minimum Mean Square Error equalization for data payload retrieval, as will be discussed further below.

A data frame structure that includes a head portion and a tail portion may be utilized for uplink channel transmissions at the physical layer The head portion may include symbols that are approximately randomized, or processed to appear more random. This randomization may not be strictly random, but may be due to processing the information in the head portion (e.g., head portion information) in a manner that makes the head portion appear to be more random and distinct. For example, this randomization may be accomplished by symbol spreading with a randomly selected spreading sequence that is longer than a spreading sequence utilized for information in the tail portion (e.g., tail portion information). This randomization may be performed to lower a mean square cross-correlation of bit sequences/symbol sequences from among different UEs in uplink communications.

In certain embodiments, the head portion information may be chosen from a select range of possible values. For example, a random multiple number of UEs from a predetermined range of UE identifiers (e.g., UE identifier values) may be automatically activated (e.g., selected for use), with the activated UE's UE identifiers (which may also be termed for simplicity as activated UE identifiers) utilized in the head portion information. Similarly, in certain embodiments, a spreading sequence identifier (e.g., Sequence IDs) may be chosen at random within a select range of spreading sequence identifiers. Such spreading sequence identifiers be termed for simplicity as chosen spreading sequence identifiers. Accordingly, the activated UE identifiers and the chosen spreading sequence identifiers may be utilized in the head portion information. Other types of head portion information may also be chosen at random within a predetermined range of values.

In various embodiments, uplink signals from UEs may share same time-frequency resource when the UEs transmit the uplink signals at a same time. This also means that the head portions of each of these uplink signals may also share the same time-frequency resources. Similarly, the tail portions of each of these uplink signals may also share the same time-frequency resources.

Figure 3:
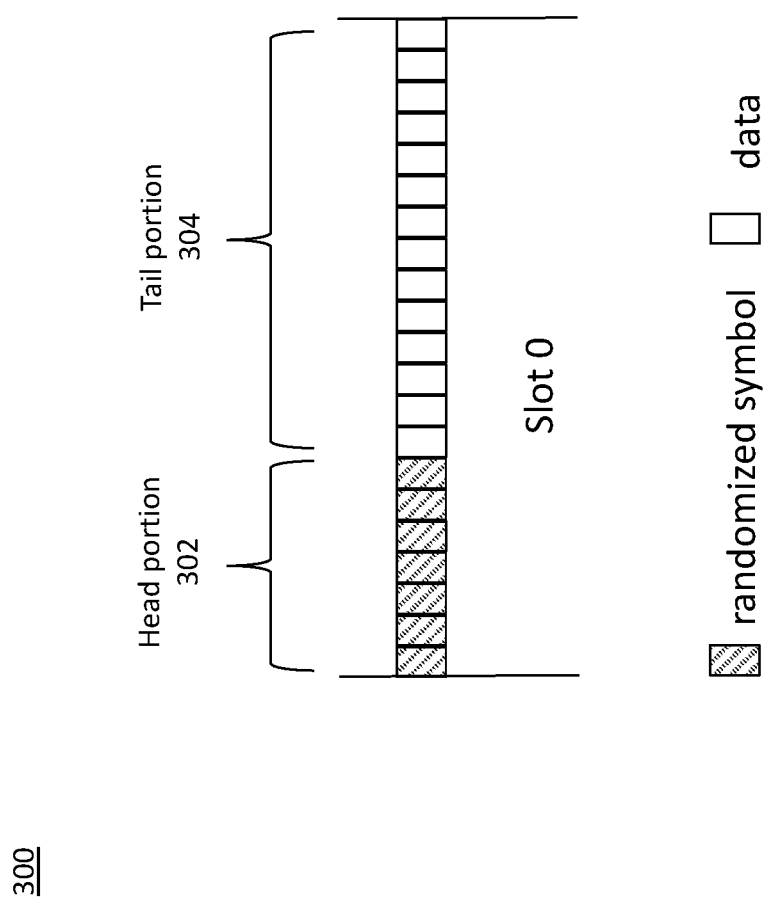
FIG. 3 is an illustration of a slot with a head portion of seven symbols and a tail portion of 14 symbols, in accordance with some embodiments of the present disclosure.

FIG. 3 is an illustration of a slot 300 with a head portion 302 of seven symbols and a tail portion 304 of 14 symbols, in accordance with some embodiments of the present disclosure. These symbols may be orthogonal frequency division multiplexing (OFDM) symbols and each symbol may occupy a number of sub-carriers in the frequency domain (e.g., 12 subcarriers). The head portion 302 may include symbols that are approximately randomized, or that are processed as noted above to appear more random or unique and to have a lower mean square cross-correlation of bit sequences/symbol sequences from among different UEs in uplink communications. In various embodiments, as will be discussed further below, the head portion 302 and the tail portion 304 may be encoded, modulated, and/or symbol spread in accordance with a predetermined transmission format. Also, the head portion information may be retrieved via appropriate dispreading, demodulation, and decoding. The tail portion information may be retrieved via appropriate dispreading, demodulation, and decoding based on the head portion information.

In certain embodiments, the head portion information may only include a UE identifier (e.g., UE_ID) for the transmitting UE. This head portion information that only includes the UE identifier may be expressed in an arbitrary number of bits, for example 32, 24, 5, or another number of bits. Stated another way, in certain embodiments the head portion information may only carry a UE identifier (e.g., a UE_ID) without other information such as a spreading sequence identifier (e.g., Sequence_ID) or other characterization of the uplink signal or data payload in the tail portion.

In particular embodiments, the head portion information may only include a UE identifier (e.g., UE_ID) for the transmitting UE and a spreading sequence identifier (e.g., Sequence_ID) used by the transmitting UE for the head portion and/or the tail portion. For example, when the UE identifier is X bits in length and the spreading sequence identifier is Y bits in length, the total number of bits for the head portion information may be X+Y bits. These X+Y bits may then be approximately randomized to appear unique as noted above to constitute the head portion of a data frame for uplink transmission.

In further embodiments, the head portion information may only include a UE identifier (e.g., UE_ID) and indication information characterizing the data sent in the uplink signal. The indication information may include, for example, power information (e.g., a signal power, or a power ratio between different UEs, or a power ratio between different layers of a UE), multi-layer information (e.g., information characterizing a layer), and/or other information that may be utilized for decoding of the data frame and/or for channel estimation. In certain embodiments, the multi-layer information may include an enable indication (e.g., indicator) that indicates whether the uplink signal is a multilayer transmission. For example, when the UE identifier is X bits in length and the indication information is Z bits in length, the total number of bits for the head portion information may be X+Z bits. These X+Z bits may then be approximately randomized (e.g., processed in a manner to appear unique) to constitute the head portion of a data frame for uplink transmission.

In further embodiments, the head portion information may include a UE identifier (e.g., UE_ID) and a spreading sequence identifier (e.g., Sequence_ID) used by the transmitting UE for the head portion and/or the tail portion, and indication information characterizing the data sent in the uplink signal. For example, when the UE identifier is X bits in length, the spreading sequence identifier is Y bits in length, and the indication information is Z bits in length, the total number of bits for the head portion information may be X+Y+Z bits. These X+Y+Z bits may then be approximately randomized (e.g., processed in a manner to appear unique) to constitute the head portion of a data frame for uplink transmission.

As noted above, this randomization may not be strictly random, but may be due to processing the head portion information in a manner that makes the head portion appear to be more random and unique. For example, this randomization may be accomplished by symbol spreading with a spreading sequence that is longer than a spreading sequence utilized for information in the tail portion (e.g., tail portion information). Also, this randomization may be accomplished by choosing the head portion information in a random but unique manner from a select range of possible values, as discussed above. This randomization may be performed to lower a mean square cross-correlation of bit sequences/symbol sequences from among different UEs in uplink communications, especially among uplink signals (e.g., head portions of the uplink signals) that share time-frequency resources with other uplink signals (e.g., a group of uplink signals share a set of continuous resources with each other).

In certain embodiments, a head portion may contain M continuous OFDM symbols, while the tail portion may contain L continuous OFDM symbols. The last OFDM symbol of the head portion (e.g., the m-th OFDM symbol) may be adjacent or next to the initial or first OFDM symbol of the tail portion. Also, each OFDM symbol may occupy K subcarriers in the frequency domain, where K is an integer (e.g., K=12). In various embodiments the head portion may contain less than or equal to one half of the number of continuous OFDM symbols of the tail portion. This may be expressed as $M \leq (1/2)*L$. In an exemplary embodiment, a data frame structure for a slot may contain M+L OFDM time domain symbols, where M=2 and L=14; M=3 and L=14; M=4 and L=14; M=5 and L=14; M=6 and L=14; or M=7 and L=14.

In particular embodiments, a data frame structure for a slot that includes M+L OFDM time domain symbols may be chosen as a closest integer value of a real number. Stated another way, the data frame structure for a slot that includes M+L OFDM time domain symbols may utilize a floor function to determine the number M of continuous OFDM symbols in a head portion. The floor function may take as input a real number x and give as output the greatest integer less than or equal to x. In certain embodiments, the floor function of a real number x may be designated as floor(x). In an exemplary embodiment, M may be either one of a: floor $((1/2)*L)$; floor $((1/3)*L)$; floor $((1/4)*L)$; floor $((1/5)*L)$; or floor $((2/5)*L)$.

Figure 4:
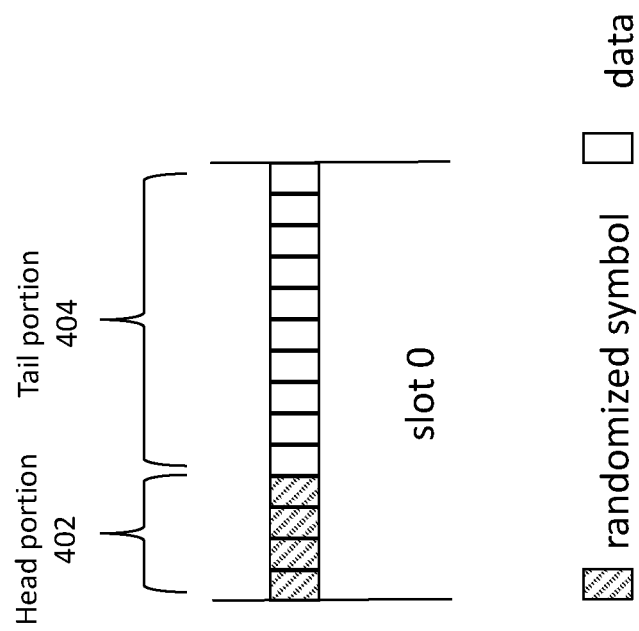
FIG. 4 is an illustration of a slot with a head portion of four symbols and a tail portion of 10 symbols, in accordance with some embodiments of the present disclosure.

FIG. 4 is an illustration of a slot 400 with a head portion 402 of four symbols and a tail portion 404 of 10 symbols, in accordance with some embodiments of the present disclosure. Here, L=10, M=floor$((2/5)*L)$=4. Also, the first to fourth OFDM time domain symbols may be part of the head portion 402, and the fifth to 14th OFDM time domain symbols may be part of the tail portion 404.

Figure 5:
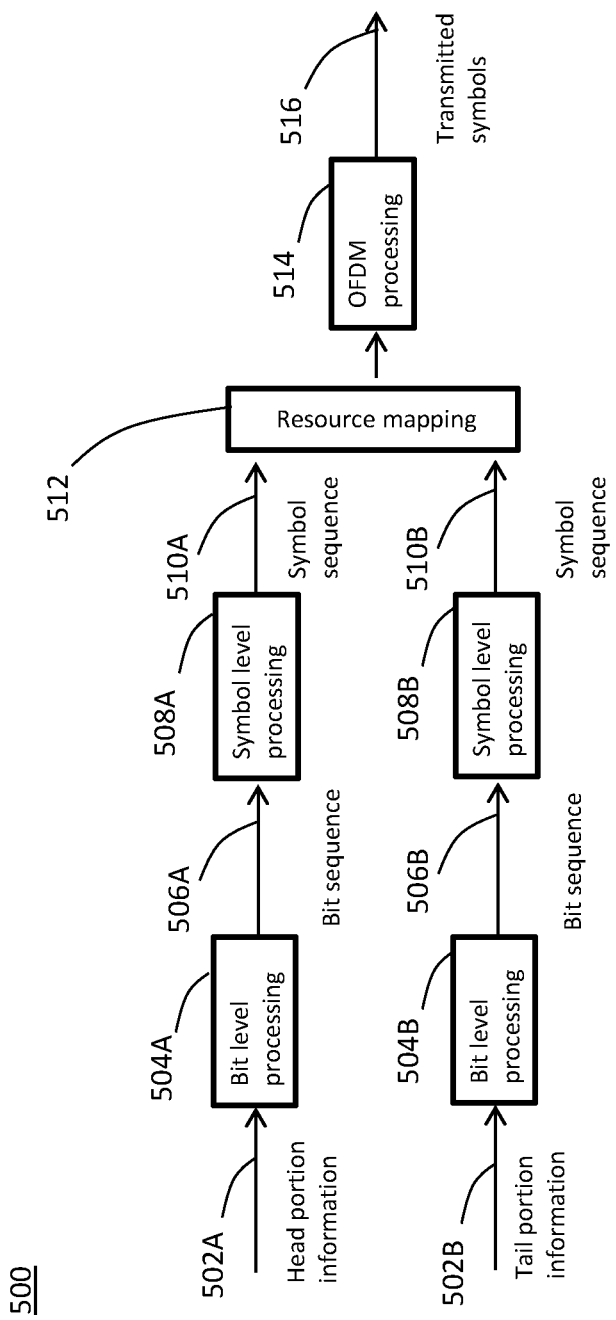
FIG. 5 is a block diagram of data processing at a transmitter, in accordance with some embodiments of the present disclosure.

FIG. 5 is a block diagram 500 of data processing at a transmitter (e.g., a UE), in with some embodiments of the present disclosure. Data processing at the transmitter may process the head portion information 502A and the tail portion information 502B in parallel. At blocks 504A and 504B, the transmitter may process each of the head portion information 502A and the tail portion information via bit level processing, respectively. The bit level processing of blocks 504A, 504B may process the bits of the head portion information 502A or tail portion information 502B to produce a respective head portion bit sequence 506A or a tail portion bit sequence 506B. The bit level processing of blocks 504A, 504B may include, for example, any type of processing of bits to produce a sequence of bits in preparation for the symbol level processing of blocks 508A, 508B. For example, the bit level processing of blocks 504A, 504B may include channel coding processing, scrambling, interleaving, and the like. However, the bit level processing of block 504A of the head portion information 502A may be more reliable (e.g., be encoded with a lower code rate or otherwise encoded in a manner less susceptible to noise) than the bit level processing of block 504B of the tail portion information 502B.

At block 508A, the transmitter may symbol level process the head portion bit sequence 506A to produce a head portion symbol sequence 510A. Also, at block 508B, the transmitter may symbol level process the tail portion bit sequence 506B to produce a tail portion symbol sequence 510B. The symbol level processing of blocks 508A 508B may include, for example, any type of processing of bits to produce a sequence of symbols in preparation for resource mapping at block 512. For example, symbol level processing at blocks 504A, 504B may include modulating a bit sequence to produce a symbol sequence. This modulation may include, for example binary phase shift keying (BPSK) or quadrature phase shift keying (QPSK) or a higher-order quadrature amplitude modulation (QAM) modulation. Also, the symbol sequences may be further symbol level processed by symbol spreading. At block 508A, the symbol level processing of the head portion bit sequence 506A may be more robust or reliable (e.g., be processed with a longer spreading sequence for symbol spreading, lower modulation order for modulation, or otherwise encoded in a manner less susceptible to noise) than the symbol level processing of the tail portion bit sequence 506B at block 508B.

As noted above, the head portion information may be processed with a lower spectral efficiency encoding or modulation scheme than the tail portion information. For example, the head portion bit sequence 506A may be obtained by coding the head portion information 502A with a lower code rate than the tail portion information 502B. Also, the head portion bit sequence 506A may be modulated (e.g., via BPSK or QPSK) with a lower modulation order than the tail portion bit sequence 506B. Lastly, symbol level processing at block 508A may spread the modulated symbols of the head portion information 502A (e.g., BPSK symbols or QPSK symbols) with a longer spreading sequence (e.g., a 4-length, 6-length, 8-length, or 12-length spreading sequence) relative to the modulated symbols of the tail portion information 502B (e.g., from block 508B).

In certain embodiments, the head information may be coded with a 1/3 code rate, modulated with a QPSK scheme, and symbol spread with 12-length spreading. In further embodiments, the head information is coded with 1/2 code rate, modulated with a BPSK scheme, and symbol spread with 8-length spreading. In yet further embodiments, the head information is coded with 1/3 code rate, modulated with BPSK scheme, and symbol spread with 6-length spreading. In further yet embodiments, the head information is coded with 1/4 code rate, modulated with BPSK scheme, and symbol spread with 4-length spreading.

Each of the head portion symbol sequences 510A produced by the symbol level processing at block 508A and the tail portion symbol sequences 510B produced by the symbol level processing at block 508B may be resource mapped at block 512. More specifically, at block 512, the transmitter may map the head portion symbol sequences 510A and the tail portion symbol sequences 510B to time frequency resources for transmission. In certain embodiments, the head portion symbol sequences 510A and the tail portion symbol sequences 510B are resource mapped together. However, in other embodiments, head portion symbol sequences 510A and the tail portion symbol sequences 510B may be resource mapped separately. For example, the head portion symbol sequences 510A and the tail portion symbol sequences 510B may be resource mapped as soon as they are available after the symbol level processing at blocks 508A, 508B. In further embodiments, the head portion symbol sequences 510A are resource mapped 512 before the tail portion symbol sequences 510B.

After resource mapping at block 512, the resource mapped symbols may be processed by orthogonal frequency division multiplexing (OFDM). Stated another way, at block 514, the transmitter may OFDM process the resource mapped symbols produced by resource mapping at block 512. The symbols of the head portion information 502A and the tail portion information 502B may be transmitted as an uplink signal 516 after OFDM processing 514. In certain embodiments, the OFDM processing at block 514 may convert the symbols of the head portion information 502A and the tail portion information 502B from the frequency domain to the time domain to be transmitted as part of a single slot of transmitted symbols, as discussed above.

Figure 6:
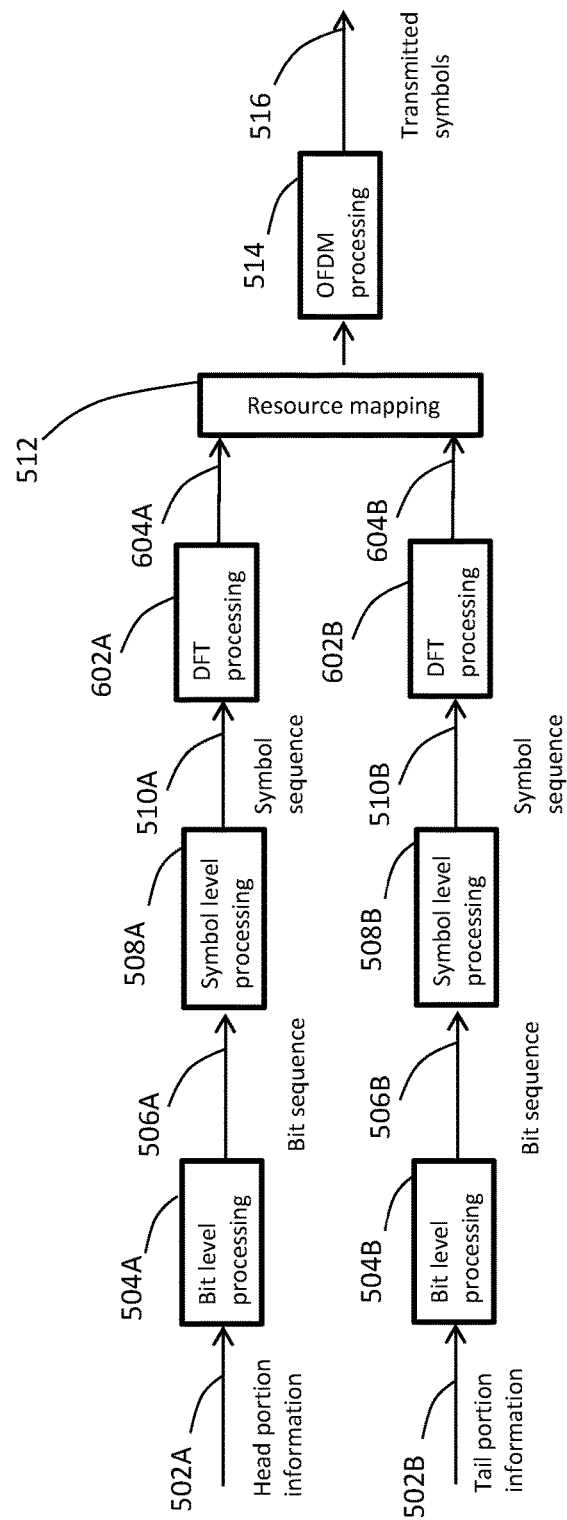
FIG. 6 is a block diagram of data processing with precoding via discrete Fourier transform at a transmitter, in accordance with some embodiments of the present disclosure.

FIG. 6 is a block diagram of data processing with precoding via discrete Fourier transform at blocks 602A, 602B at a transmitter 600, in accordance with some embodiments of the present disclosure. Various aspects of FIG. 6 are already discussed above in reference to FIG. 5 and will not be repeated here for brevity. Returning to FIG. 6, as noted above, the head portion bit sequence 506A may be symbol level processed at block 508A to produce a head portion symbol sequence 510A. Also, the tail portion bit sequence 506B may be symbol level processed at block 508B to produce a tail portion symbol sequence 510B. At block 602A, the transmitter may precode the head portion bit sequence 510A via a discrete Fourier transform (DFT) to produce a DFT precoded head portion symbol sequence 604A. Also, at block 602B, the transmitter may precode the tail portion bit sequence 506B via a DFT to produce a DFT precoded tail portion symbol sequence 604B. Both the DFT precoded head portion symbol sequence 604A and DFT precoded tail portion symbol sequence 604B may be resource mapped at block 512, in the manner noted above. In certain embodiments, the DFT precoded head portion symbol sequence 604A and DFT precoded tail portion symbol sequence 604B are resource mapped together. However, in other embodiments, the DFT precoded head portion symbol sequence 604A and DFT precoded tail portion symbol sequence 604B may be resource mapped separately. For example, the DFT precoded head portion symbol sequence 604A and DFT precoded tail portion symbol sequence 604B may be resource mapped as soon as they are available after the DFT processing 602A, 602B. In further embodiments, the DFT precoded head portion symbol sequence 604A is resource mapped before the DFT precoded tail portion symbol sequence 604B.

The addition of DFT preprocessing may enable transmission of resources (e.g., discrete Fourier precoded OFDM symbols) associated with the head portion information 502A and/or the tail portion information 502B further (e.g., provide a greater coverage area for an associated uplink signal), than without the addition of DFT preprocessing. Also, the addition of DFT preprocessing may reduce the amount of power required for transmission of the resources (e.g., symbols) associated with the head portion information 502A and/or the tail portion information 502B. Furthermore, the addition of DFT processing may cause the head portion information and tail portion information to be associated with a larger cyclic prefix and thus more robust to a time delay (e.g. less susceptible to invalid operation due to a time delay). In certain embodiments, DFT processing can be done before symbol spreading (e.g., processing via symbol spreading). In further embodiments, a whole discrete Fourier transform-spread-OFDM (DFT-S-OFDM) symbol block may be spread (e.g., processed via symbol spreading) to reduce a peak to average power ratio (PAPR).

Figure 7:
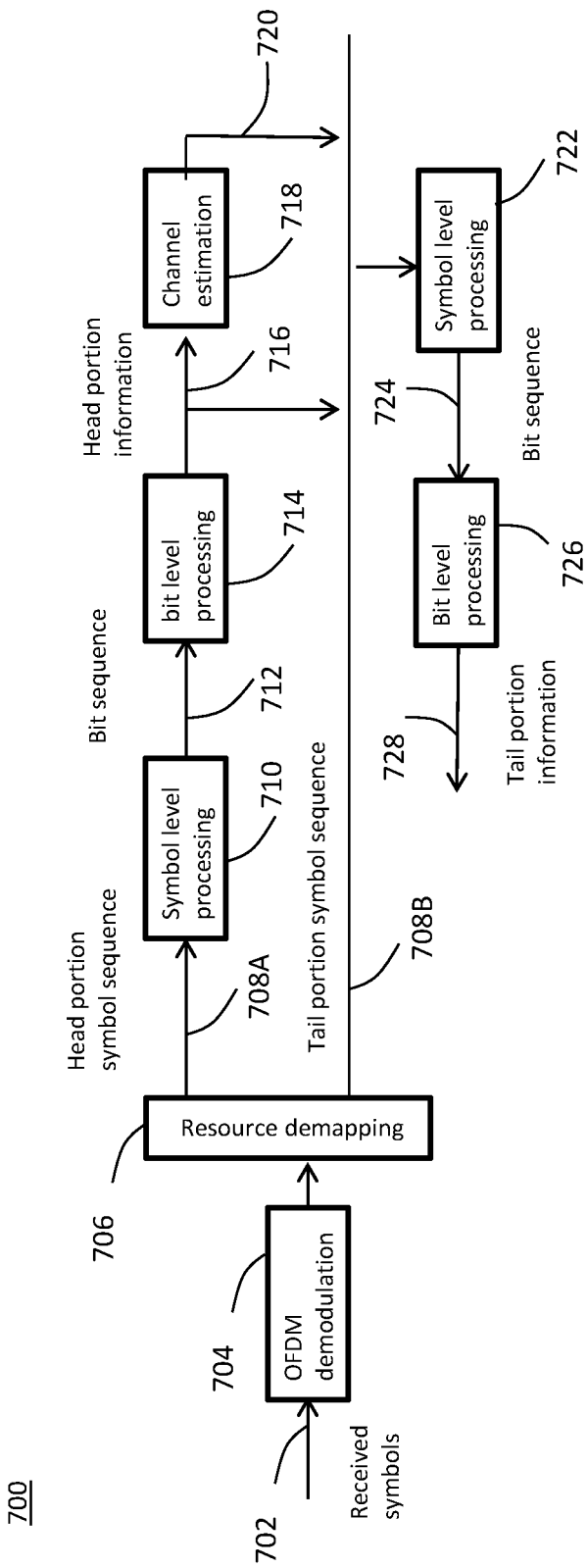
FIG. 7 is a block diagram of data processing at a receiver, in accordance with some embodiments of the present disclosure.

FIG. 7 is a block diagram 700 of data processing at a receiver (e.g., a BS), in accordance with some embodiments of the present disclosure. The receiver (e.g., a BS) may receive an uplink signal 702. At block 704, the receiver may demodulate the uplink signal. The demodulation of the uplink signal may be a reverse operation of the modulation of the uplink signal, discussed above. At block 706, the receiver may resource demap the demodulated uplink signal. The resource demapping may enable identification of (e.g., identify) certain resources as either a head portion symbol sequence 708A and/or a tail portion symbol sequence 708B. At block 710, symbol level processing may be performed upon the head portion symbol sequence 708A. The symbol level processing of block 710 may decode the head portion symbol sequence 708A into a head portion bit sequence 712. The symbol level processing of block 710 may be an inverse of the above discussed symbol level processing for encoding head portion information with an uplink signal at the transmitter. At block 714, bit level processing may be performed on the head portion bit sequence 712. The bit level processing may be an inverse of the above discussed bit level processing for encoding head portion information with an uplink signal at the transmitter. Based on the bit level processing in block 714, head portion information 716 may be obtained. As discussed above, the head portion information 716 may include a UE identifier (e.g., UE_ID) for the transmitting UE, a spreading sequence identifier (e.g., Sequence_ID) used by the transmitting UE for the head portion and/or the tail portion, and/or indication information characterizing the data sent in the uplink signal. The indication information may include, for example, power information (e.g., a signal power, or a power ratio between different UEs, or a power ratio between different layers of a UE), multi-layer information (e.g., information characterizing a layer), and/or other information that may be utilized for decoding of the data frame and for channel estimation. Accordingly, at block 718, channel estimation may be performed on the head portion information 716. The channel estimation may produce a channel response value 720 or other result from channel estimation for the decoding of the tail portion symbol sequence 708B.

At block 722, the tail portion symbol sequence 708B may be symbol level processed with both the head portion information 716 and the channel response value 720 to produce a tail portion bit sequence 724. In certain embodiments, the symbol level processing of block 722 may be an inverse of the above discussed symbol level processing for tail portion information with an uplink signal at the transmitter. At block 726, the tail portion bit sequence 724 may be bit level processed to produce tail portion information 728. The bit level processing may be an inverse of the above discussed bit level processing for tail portion information with an uplink signal at the transmitter. The tail portion information 728 may include a data payload (e.g., user data) associated with a slot sent by the transmitter of the uplink signal 702.

As discussed above, the head portion of the uplink signal 702 may be transmitted as approximately randomized symbols to appear more unique. By being approximately randomized, the head portion may have lower mean square cross-correlation characteristics than the tail portion of the uplink signal 702. Also, in the course of being approximately randomized, the head portion information may be encoded using a lower spectral efficiency encoding, modulated using a lower modulation order, and symbol spread using a longer spreading sequence than the tail portion information.

Accordingly, even if the head information of multiple UEs are mixed together (e.g., combined in transmission to share frequency and/or time domain resources), the head portions of each UE can be individually identified and separated from the head portions of other UEs. This may be accomplished by, for example, interference suppression techniques such as minimum mean square error (MMSE) equalization, and successive interference cancellation (SIC) techniques. In certain embodiments, a separated symbol stream produced by a MMSE technique (e.g., processing via a channel response weighted signal) can be blind equalized according to its constellation shape.

Furthermore, the head portion information 716 may be utilized for decoding the tail portion symbol sequence 708B. For example, the head portion information 716 may include a UE identifier (e.g., UE_ID) for the transmitting UE, a spreading sequence identifier (e.g., Sequence_ID) used by the transmitting UE for the head portion and/or the tail portion, and/or indication information characterizing the data sent in the uplink signal. The indication information may include, for example, power information (e.g., a signal power, or a power ratio between different UEs, or a power ratio between different layers of a UE), multi-layer information (e.g., information characterizing a layer), and/or other information that may be utilized for decoding of the data frame and for channel estimation. Also, channel estimation may be performed on the head portion information 716. The channel estimation may produce a channel response value 720 or other result from channel estimation for decoding of the tail portion symbol sequence 708B.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication device, comprising:
    associating a time slot with a data packet comprising a head portion and a tail portion, wherein the head portion comprises a communication device identifier and the tail portion comprises user data associated with the head portion;
    encoding, modulating, and spreading the tail portion in parallel with the head portion, wherein spreading the tail portion in parallel with the head portion comprises:
        spreading the head portion into a first predetermined transmission format;
        spreading the tail portion into a second predetermined transmission format; and
    transmitting the spread head portion with the spread tail portion to a communication node, wherein the spread head portion comprises information to be used by the communication node for channel estimation and for decoding the tail portion to retrieve the user data, wherein the head portion comprises a first bit sequence, and the tail portion comprises a second bit sequence, wherein:
        a first mean square cross-correlation among the first bit sequence and a first plurality of bit sequences is lower than a second mean square cross-correlation among the second bit sequence and a second plurality of bit sequences, wherein each of the first plurality of bit sequences is associated with a respective head portion in each of a first plurality of communication devices, and each of the second plurality of bit sequences is associated with a respective tail portion in each of the first plurality of communication devices, and
        each of the first plurality of communication devices transmits the respective head portion and the respective tail portion to the communication node.

2. The method of claim 1, wherein a spreading sequence associated with the head portion is longer than a spreading sequence associated with the tail portion.

3. The method of claim 1, wherein a coding and modulation scheme with the head portion is less susceptible to noise than a coding and modulation scheme associated with the tail portion.

4. The method of claim 1, further comprising:
    processing the head portion and the tail portion by bit level processing and symbol level processing.

5. The method of claim 4, wherein the symbol level processing comprises modulation and symbol spreading.

6. The method of claim 1, further comprising:
    precoding the head portion and the tail portion by discrete Fourier transfer processing.

7. The method of claim 1, wherein the head portion and the tail portion are resource mapped together.

8. The method of claim 1, wherein the head portion and the tail portion are resource mapped separately.

9. The method of claim 1, wherein the head portion comprises at least one of a spreading sequence identifier and an indicator characterizing the tail portion.

10. A non-transitory computer-readable medium having stored thereon computer-executable instructions for carrying out the method of claim 1.

11. A method performed by a communication node, comprising:
    receiving a data packet over a time slot from a communication device; identifying a head portion and a tail portion from the data packet, wherein the head portion comprises a communication device identifier and the tail portion comprises user data associated with the head portion, wherein the tail portion is encoded, modulated, and spread in parallel with the head portion, wherein the head portion comprises a first bit sequence, and the tail portion comprises a second bit sequence, wherein:
        a first mean square cross-correlation among the first bit sequence and a first plurality of bit sequences is lower than a second mean square cross-correlation among the second bit sequence and a second plurality of bit sequences, wherein each of the first plurality of bit sequences is associated with a respective head portion in each of a first plurality of communication devices, and each of the second plurality of bit sequences is associated with a respective tail portion in each of the first plurality of communication devices, and
        each of the first plurality of communication devices transmits the respective head portion and the respective tail portion to the communication node;
    blind decoding the head portion from a first predetermined transmission format;
    performing channel estimation based on the decoded head portion; and
    decoding the tail portion based on the decoded head portion and a result of the channel estimation to retrieve the user data.

12. The method of claim 11, wherein the head portion comprises at least one of a spreading sequence identifier and an indicator characterizing the tail portion.

13. The method of claim 11, further comprising:
    receiving a group of packets mapped onto a set of continuous time and frequency resources, wherein the data packet is part of the group of packets.

14. The method of claim 11, wherein a spreading sequence associated with the head portion is longer than a spreading sequence associated with the tail portion.

15. The method of claim 11, wherein a coding and modulation scheme with the head portion is less susceptible to noise than a coding and modulation scheme associated with the tail portion.

16. The method of claim 11, wherein the data packet is precoded by discrete Fourier transfer processing.

17. A non-transitory computer-readable medium having stored thereon computer-executable instructions for carrying out the method of claim 11.

* * * * *